July 13, 1954
J. J. KOZELISKI
2,683,527
STEERING WHEEL ASH TRAY
Filed Jan. 11, 1952
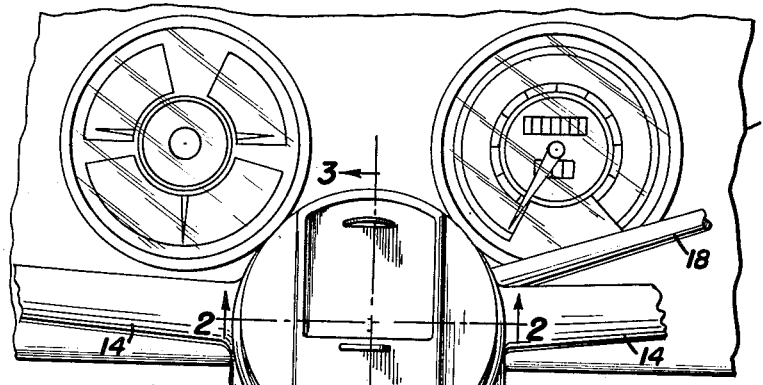
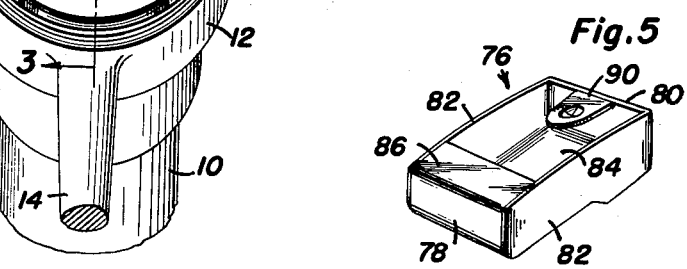
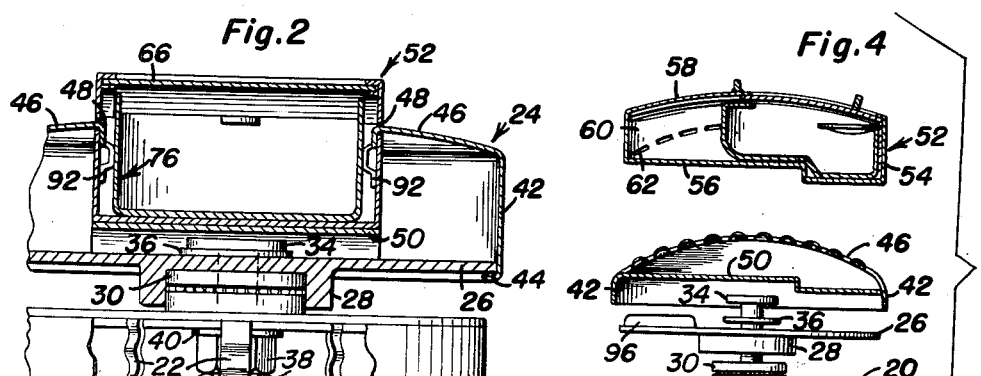
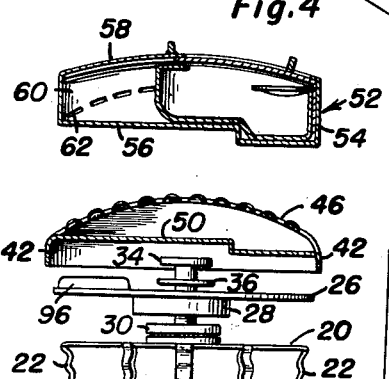
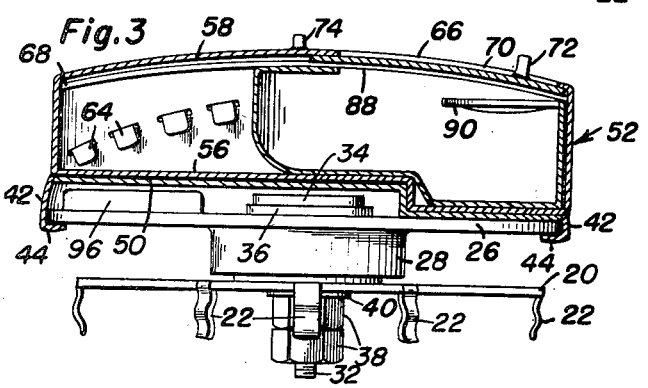
Julius J. Kozeliski
INVENTOR.
BY
*Attorneys*

Patented July 13, 1954

2,683,527

UNITED STATES PATENT OFFICE 2,683,527

STEERING WHEEL ASH TRAY

Julius J. Kozeliski, Roundup, Mont.

Application January 11, 1952, Serial No. 266,058

1 Claim. (Cl. 206—19.5)

This invention relates generally to an ash tray, and more specifically to an ash tray which is especially adapted for installation on the steering wheel of an automobile.

In the modern automobile, the construction of the dashboard is such that the ash trays generally found incorporated therein are on the right hand side of the dashboard and out of convenient reach of the driver. If the driver of the automobile desires to smoke, he must either open his window to dispose of the ashes or reach over on the right hand side of the dashboard to dispose of the ashes, thereby being required to assume an awkward position in which his driving ability is handicapped. Attempts have been made to devise an ash tray which may be conveniently secured to a steering wheel, but all such ash trays on the market are adapted to be secured to either one of the spokes of the steering wheel or the rim thereof. An ash tray so disposed on the steering wheel of a vehicle is in a position where it may be hooked on a coat sleeve or otherwise hinder the driver of the automobile to which it is attached.

A primary object of this invention is to provide an improved ash tray which may be conveniently secured to the steering wheel of an automobile in a position where it may be conveniently reached by the driver of the automobile, and at the same time being in a position where it does not handicap said driver.

Another object of this invention is to provide an improved ash tray structure which may be conveniently secured to the steering wheel of an automobile, said ash tray being so mounted that it remains in a vertical position regardless of the position of the steering wheel.

Another object of the invention is to provide an improved ash tray structure for mounting on the steering wheel of an automobile, said ash tray having a removable ash receiver whereby the ash tray may be conveniently emptied.

Another object of this invention is to provide an improved ash tray structure which may be easily secured to the steering wheel of an automobile without cutting or drilling the steering wheel, or in any way disfiguring same.

A further object of this invention is to provide an improved ash tray structure for use with the steering wheel of an automobile, said ash tray structure being designed to replace the conventional cover in the center thereof.

With these objects definitely in view, this invention resides in certain novel features of construction, combination and arrangement of elements and portions as will be hereinafter described in detail in the specification, particularly pointed out in the appended claim, and illustrated in the accompanying drawings which form a material part of this application, and in which:

Figure 1 is a perspective view of the central portion of a steering wheel of an automobile as viewed from the driver's seat, said steering wheel having mounted therein the improved ash tray structure, which is the subject of this invention;

Figure 2 is an enlarged transvere vertical sectional view taken substantially upon the plane indicated by the section line 2—2 of Figure 1 and showing the manner in which the ash tray structure is secured to the steering wheel;

Figure 3 is an enlarged transverse vertical sectional view taken substantially upon the plane indicated by the section line 3—3 of Figure 1, the steering wheel structure being omitted, and showing the construction of a housing portion of the ash tray structure;

Figure 4 is an exploded view of the ash tray structure, which is the subject of this invention, the housing and its associated ash tray portion being shown in section in order to more clearly illustrate their construction; and Figure 5 is an enlarged perspective view of the removable ash receiver and showing the specific construction thereof.

Similar characters of reference designate similar or identical elements and portions throughout the specification and throughout the different views of the drawings.

Referring now to the drawings in detail, it will be seen that in Figure 1 there is illustrated a steering column 10 on which is rotatably mounted a conventional steering wheel 12 having a plurality of spokes 14, said steering wheel 12 being mounted in front of a conventional dashboard 16. Also carried by the steering column 10 is a conventional gear shift lever 18. The steering wheel 12 is of the conventional type which has a hollow central portion which houses its connecting means with the steering shaft (not shown) and is provided with an ornamental cover (not shown). Mounted within the central portion of the steering wheel 12 in lieu of the conventional cover is the ash tray structure which is the subject of this invention.

Referring now to Figures 2, 3 and 4 in particular, it will be seen that the ash tray structure, which is the subject of this invention, includes a supporting plate 20 which has projected from its underside a plurality of spring fingers 22 which are spaced about the peripheral edge thereof. The supporting plate 20 is of the same size as the ornamental cover for the central housing of the steering wheel 12, and is secured to the steering wheel 12 by the spring fingers 22.

The housing portion of the ash tray structure is referred to generally by reference numeral 24, and includes a bottom plate 26 which is circular in plan view and of a slightly greater diameter than the supporting palte 20. The bottom plate 26 is provided with a centrally located annular flange 28 on its underside, and has mounted therein a bearing 30. The bottom plate 26 of the housing 24 and the supporting plate 20 have aligned apertures through which is passed an elongated headed shaft in the form of a threaded bolt 32 having a flat upper head 34. Disposed between the flat head 34 of the bolt and the upper surface of the bottom plate 26 is a flat washer 36 carried by the bolt 32. The bolt 32 also passes through the bearing 30, which is journaled thereon, and is provided with a pair of nuts 38 threaded on its lower end for securing the supporting plate 20 to the bottom plate 26. Disposed between the uppermost nut 38 and the bottom of the supporting plate 20 is a flat washer 40 mounted on the bolt 32. The bearing 30 engages the upper surface of the supporting plate 20 and adjustment of the bearing 30 is provided by either tightening or loosening the nuts 38.

The upper portion of the housing 24 is in the form of a shell having a cylindrical vertical wall 42 which has a continuous inturned bottom flange 44 which underlies the edge of the bottom plate 26 and secures the shell portion thereto. Integral with the side wall 42 are two spaced partial top walls 46 which are generally arcuate and have parallel spaced inner edges 48. Secured to the side wall 42 and extending in alignment with the space between the partial top walls 46 is a bottom wall 50 which is generally Z-shaped in cross section and has one flange thereof engaging the upper surface of the bottom plate 26.

The ash tray portion of the ash tray structure, which is the subject of this invention, includes a housing 52 having curved end walls 54, a bottom wall 56 and an arcuate top wall 58. The bottom wall 56 is substantially Z-shaped in cross section so as to provide a stepped bottom, the shape of the bottom 56 conforming substantially to the shape of the bottom 50 of the housing 24. The housing 52 is also provided with a pair of spaced parallel end walls 60 having a plurality of slots 62 formed therein along a curved line conforming to the shape of the inner edge 48 of the top wall 46 of the housing 24. As is best illustrated in Figure 3, the inner edges 48 of the top wall sections 46 are provided with a plurality of spaced tabs 64 which are passed through the spaced slots 62 and bent over in order to retain the ash tray housing within the housing 24.

The top wall 58 of the ash tray housing 52 is provided with a substantially rectangular opening 66 which extends from the middle portion thereof to one end. Carried by the side walls 60 closely adjacent to the top wall 58 are guide elements 68. Slidably mounted between the guide elements 68 and the top wall 58 of the housing 52 is a cover 70 for closing the opening 66. The cover 70 is provided with an upstanding tab 72 in alignment with a second upstanding tab 74 carried by the top wall 58 near the inner edge of the opening 66. The cover 70 is moved to its open position by engaging the upstanding tabs 72 and 74 with the fingers and squeezing the tabs toward one another.

Removably mounted within the housing 52 of the ash tray is an ash receiver 76. The ash receiver has parallel end walls 78 and 80, parallel side walls 82, a bottom wall 84 and a partial top wall 86. The bottom wall 84 is also Z-shaped in cross section and engages with the bottom wall 56 of the housing 52 to retain the ash receiver 76 in place within the housing 52. The partial top wall 86 is at one end of the ash receiver 76 and provides an opening 88 in the top wall of the ash receiver in alignment with the opening 66 in the top wall of the ash tray housing 52. Extending inwardly in alignment with the opening 88 and integral with the upper edge of the end wall 80 is a cigarette supporting flange 90. Referring to Figure 2, it will be seen that the ash receiver 76 is rigidly held in place within the ash tray housing 52 by a pair of projections on the side walls 60 which compressively engage the side walls 82, the projection being referred to by the reference numeral 92.

In view of the foregoing, it will be seen that since the housing 24 is rotatably mounted with respect to the supporting plate 20, and since the ash tray housing 52 and the ash receiver 76 is mounted within the housing 24, the ash receiver 76 may be positioned in any desired relation to the steering wheel 12. In order that the ash tray housing 52 may remain in a vertical position as illustrated in Figure 1, the bottom plate 26 of the housing 24 is provided with a weight 96 in alignment with the lower edge of the ash tray housing 52. It will be readily apparent that when the steering wheel 12 is rotated with respect to the steering column 18, that the housing 24 will tend to remain stationary due to the force of gravity on the weight 96.

The operation of this ash tray structure will be understood from the foregoing description of the mechanical details thereof, taken in connection with the above recited objects and the drawings. Further description would appear to be unnecessary.

Minor modification of the ash tray structure, bearing in mind the details from the embodiment of the ash tray structure illustrated and described here may be resorted to without departure from the spirit and scope of this invention, as defined in the appended claim.

Having described the invention, what is claimed as new is:

An ash tray attachment for a conventional automobile steering wheel comprising a supporting plate, means carried by said supporting plate for removably securing said supporting plate in position in the central hub portion of a steering wheel, a shaft carried by said supporting plate and extending upwardly therefrom, said supporting plate being adapted to lie in the plane of the steering wheel and said shaft being disposed in coaxial relation with the steering column when mounted on a steering wheel, a housing carried by said shaft for rotation relative to said supporting plate, a removable ash receiver carried by said housing, said ash receiver extending diametrically of said housing and having an ash receiving opening at one end adjacent the periphery of the housing, a weight carried within said housing in substantially coplanar alignment with said ash receiver, said weight being disposed in the lower portion of said housing diametrically opposite said opening and adapted to retain said ash receiver stationary with respect to the steering column irrespective of the rotated position of said supporting plate.

References Cited in the file of this patent

UNITED STATES PATENTS

| Number | Name | Date |
|---|---|---|
| 1,348,134 | Barnstead | July 27, 1920 |
| 1,859,352 | Albee | May 24, 1932 |
| 1,932,625 | Hopple | Oct. 31, 1933 |
| 2,062,807 | Cramer | Dec. 1, 1936 |
| 2,095,983 | Hollingsworth | Oct. 19, 1937 |
| 2,119,267 | Coleman | May 31, 1938 |
| 2,160,348 | Wallace | May 30, 1939 |
| 2,359,771 | Mariani | Oct. 10, 1944 |
| 2,447,188 | Langley | Aug. 17, 1948 |